UNITED STATES PATENT OFFICE.

CHARLES C. HALLOCK, OF BROOKLYN, NEW YORK, ASSIGNOR OF ONE-HALF HIS RIGHT TO ASA HOYT, OF SAME PLACE.

IMPROVEMENT IN COATING CONCRETE AND CEMENT FLOORS, PAVEMENTS, &C.

Specification forming part of Letters Patent No. 121,284, dated November 28, 1871.

*To all whom it may concern:*

Be it known that I, CHARLES C. HALLOCK, of Brooklyn, in the county of Kings and State of New York, have invented a new and Improved Surfacing Material for Concrete and Cement Floors and Pavements; and I hereby declare that the following is a full, clear, and exact description of the same.

My invention relates to an improved method of producing a durable, smooth, and ornamental surface upon pavements and floors, especially such as are composed of or covered with concrete, cement, or other analogous compositions.

In putting my invention into practice I make a composition of ground or pulverized stone or fine sand, linseed-oil, gum copal or shellac, and red lead or litharge, and with or without coloring matter. The pulverized stone is preferable to sand, and any suitable kind of stone may be ground to a fine powder for the purpose—say bluestone, redstone, barytes, or any stone suitable for use in the manufacture of mineral paints. The linseed-oil used is preferably boiled oil. Other oils may be used—cotton-seed oil, for instance—but I deem linseed-oil the best. Shellac is preferable to other gums; but as it is quite expensive I find it expedient to employ gum copal; and indeed the comparatively inexpensive gum of the class called gum kourie will answer well. Shellac and gum copal together answer admirably. The rough copal gum should be first softened in linseed-oil under heat in the usual way. The red lead or litharge acts as a drier and hardener. Any chemical equivalent therefor may be employed, as, for instance, sugar of lead; but the litharge is cheap and answers well. The coloring matter is used, as is obvious, for coloring the composition, and any suitable pigment or coloring matter may be employed for such purpose.

I will describe my invention as put into practice upon a concrete sidewalk, such, for instance, as are known by the name of Scrimshaw pavement, Hoyt pavement, Fisk pavement, &c.

To produce the surfacing composition I find the following proportions will answer: Of powdered stone I take, say, fifteen pounds; linseed-oil, one gallon; gum copal or shellac, one pound; red lead or litharge, two pounds. These ingredients properly mixed produce a thick plastic material, which may be reduced, if too thick, by the addition of linseed-oil alone or with turpentine. When coloring matter is used the quantity will depend on the kind of coloring matter and the color required, and can be easily determined by the eye. If powdered bluestone be used in the formula above given, five pounds of white lead would give the mixture a light slate color.

The composition is applied to the pavement with a brush or trowel, much like the art of painting or cementing. When so applied, fine sand, say white sand, is poured on this coating and rolled or worked in with a roller or trowel, or in any convenient manner. If too much sand be put upon it no damage is done. The coating should be supplied with all it can take up, and the balance may be brushed off with a broom as soon as the rolling or working in is accomplished. In a few hours after the surfacing is done the coating becomes as hard as stone, thus showing how rapidly the work of surfacing may be performed by my invention.

From the above description it will be readily understood that designs of various kinds and colors, borders, squares, diamonds, flowers, numbers, names, &c., may be readily produced; and hence a tessellated pavement of the most attractive pattern may instantly, as it were, be produced. The gum, which is insoluble in water, and the linseed-oil and the ground stone unite in one homogeneous mass and form an obdurate surface, which will resist the action of the atmosphere and rain and endure exceedingly hard usage.

What I claim as my invention, and desire to secure by Letters Patent, is—

1. A composition composed of powdered stone, linseed-oil, gum copal or shellac, and litharge, made in substantially the manner herein specified.

2. The method of producing a stony surface on a concrete or cement pavement or floor, substantially as herein described.

CHAS. C. HALLOCK.

Witnesses:
M. M. LIVINGSTON,
T. B. BEECHER.